United States Patent
Wadge et al.

(10) Patent No.: US 7,356,930 B2
(45) Date of Patent: Apr. 15, 2008

(54) METHOD AND APPARATUS FOR REMOVING DUST FROM A WORKPIECE

(75) Inventors: Brian Wadge, Spennymoor (GB); Stephen Houghton, Spennymoor (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/548,892

(22) PCT Filed: Mar. 11, 2004

(86) PCT No.: PCT/EP2004/002518

§ 371 (c)(1),
(2), (4) Date: Sep. 12, 2005

(87) PCT Pub. No.: WO2004/080636

PCT Pub. Date: Sep. 23, 2004

(65) Prior Publication Data

US 2006/0191140 A1     Aug. 31, 2006

(30) Foreign Application Priority Data

Mar. 13, 2003  (GB) .................................. 0305712.2

(51) Int. Cl.
*B27B 19/09*   (2006.01)
*B26D 7/18*    (2006.01)

(52) U.S. Cl. ........................... 30/123.3; 30/392; 30/124

(58) Field of Classification Search ................. 30/123, 30/123.3, 124, 375, 392, 393; 408/61, 68, 408/56; 83/169, 98; 407/11
See application file for complete search history.

(56) References Cited

U.S. PATENT DOCUMENTS

| | | | |
|---|---|---|---|
| 1,833,785 A | * | 11/1931 | Krieger .......................... 83/98 |
| 1,932,511 A | * | 10/1933 | Clarke ....................... 83/486.1 |
| 2,822,005 A | | 2/1958 | Fogle et al. |
| 3,206,989 A | | 9/1965 | Enders |
| 3,882,598 A | * | 5/1975 | Earle et al. .................... 30/390 |
| 4,051,880 A | * | 10/1977 | Hestily ..................... 144/252.1 |
| 4,090,297 A | | 5/1978 | Wanner et al. |
| 4,195,403 A | | 4/1980 | Gruber |

(Continued)

FOREIGN PATENT DOCUMENTS

DE            79 19 565        7/1979

(Continued)

*Primary Examiner*—Boyer D. Ashley
*Assistant Examiner*—Laura M. Lee
(74) *Attorney, Agent, or Firm*—Harness, Dickey & Pierce, P.L.C.

(57) ABSTRACT

A duct mechanism for directing a flow of air onto a working member of a power cutting tool generally includes a housing, a motor in the housing, a working member actuated by means of the motor and a shoe pivotally mounted relative to the working member and adapted to engage a workpiece. The duct mechanism includes an inlet portion mounted to the housing. The inlet portion receives a stream of air from the housing. An outlet portion is connected to the shoe for directing the stream of air onto the working member in a direction transverse to a line of action of the tool. At least one connecting portion connects the inlet portion and the outlet portion. The at least one connecting portion allows the outlet portion to pivot with the shoe relative to the inlet portion.

13 Claims, 11 Drawing Sheets

U.S. PATENT DOCUMENTS

| | | | |
|---|---|---|---|
| 4,628,605 A | | 12/1986 | Clowers |
| 4,665,617 A | | 5/1987 | Maier et al. |
| 4,730,397 A | * | 3/1988 | Weiford et al. ............... 30/392 |
| 4,870,755 A | * | 10/1989 | Schnizler .................... 30/123.3 |
| 5,012,583 A | | 5/1991 | Blochle et al. |
| 5,199,174 A | | 4/1993 | Wild |
| 5,479,709 A | | 1/1996 | Lai |
| 5,539,985 A | | 7/1996 | Wershe |
| 5,680,704 A | * | 10/1997 | Okubo et al. .................. 30/124 |
| 6,230,411 B1 | | 5/2001 | Wall et al. |
| 6,557,261 B1 | * | 5/2003 | Buser et al. .................. 30/124 |
| 6,827,640 B2 | * | 12/2004 | Bures et al. ................ 451/456 |
| 6,892,459 B2 | | 5/2005 | Okumura et al. |
| 2004/0112191 A1 | * | 6/2004 | Whiffen ......................... 83/24 |
| 2005/0279424 A1 | | 12/2005 | Rosendahl |

FOREIGN PATENT DOCUMENTS

| | | | |
|---|---|---|---|
| DE | 37 17 585 | | 12/1988 |
| DE | 203 10 902 U1 | | 10/2003 |
| EP | 0 347 631 A2 | | 12/1989 |
| EP | 0 221 652 | | 2/1990 |
| EP | 0 521 263 | | 1/1993 |
| EP | 0 658 389 | | 6/1995 |
| EP | 1260299 | * | 5/2002 |
| WO | 2004/080635 A1 | | 9/2004 |

* cited by examiner

METHOD AND APPARATUS FOR REMOVING DUST FROM A WORKPIECE

FIELD

The present invention relates to a method of removing dust from a workpiece during operation thereon by a power tool, and relates particularly, but not exclusively, to a method of removing sawdust from a workpiece during sawing thereof by a jigsaw, and to a mechanism for carrying out such a method.

BACKGROUND

Dust removal methods for jigsaws are well known, the two main methods consisting of blowing the dust out of the way of the jigsaw blade, or sucking the dust into a dust extraction device such as a vacuum cleaner. In either case, a blower or sucker is positioned immediately behind the jigsaw blade along the line of cutting action of the jigsaw. In particular, DE 2546527, DE 4316155, EP 0347631 and EP 0603552 all disclose arrangements in which a dust inlet connected to a suction source is arranged adjacent the blade of a power saw. However, these known methods suffer from the drawback that if the blower or sucker is positioned too close to the blade it becomes obtrusive, whereas if it is too far away from the blade, it is insufficiently effective. Also, by blowing dust in a direction parallel to the line of action of the tool, dust may be blown onto the line to be cut by the tool, which may impede its visibility and the subsequent cutting action.

SUMMARY

Preferred embodiments of the present invention seek to overcome the above disadvantages of the prior art.

According to an aspect of the present invention, there is provided a method of removing dust from a workpiece during operation thereon by a power cutting tool having a housing, a motor in the housing, and a working member adapted to be actuated by means of said motor, the method comprising directing a stream of air onto said working member in a direction transverse to a line of action of the tool.

By directing a stream of pressurised gas onto a working member in a direction transverse to a line of action of the tool, this provides the advantage that the outlet of the stream of pressurised gas can be located very close to the working member, in order to be effective in blowing dust away from the working member, without the disadvantage of the outlet becoming obtrusive to a user of the tool. Furthermore, by blowing dust in a direction transverse to the line of action of the tool, the further advantage is provided that dust is blown away from the line to be cut, as opposed to onto that line.

The air may be air delivered by a fan used to cool said motor.

The method may further comprise the step of providing an inlet to a suction source adjacent said working member on a side thereof opposite to the side from which said air is supplied.

This provides the advantage of further constraining airflow across the working member of the tool, which minimises the tendency for dust blown away from the working member to be scattered over a large area, thereby improving effectiveness of dust removal.

According to another aspect of the present invention, there is provided a duct mechanism for directing flow of air onto a working member of a power cutting tool having a housing, a motor in the housing, a working member adapted to be actuated by means of said motor, and a shoe pivotally mounted relative to the working member and adapted to engage a workpiece, the mechanism comprising:

inlet means adapted to be mounted to the housing for receiving a stream of air from said housing;

outlet means adapted to be fixed in position relative to said shoe for directing said stream of air onto said working member in a direction transverse to a line of action of the tool; and at least one connecting portion for connecting said inlet means and said outlet means, wherein the or each said connecting portion is adapted to allow said outlet means to pivot with said shoe relative to said inlet means.

At least one said connecting portion may be flexible.

At least one said connecting portion may comprise a first part integral with one of said inlet or said outlet means, and a second part integral with the other of said inlet means or said outlet means and at least partially received within said first part so as to be slidable relative to said first part.

This provides the advantage of enabling the connecting portion to be made from more durable material than in the case of a flexible connecting portion.

Said first and second parts may have mating curved surfaces in a plane substantially perpendicular to the axis of pivotal movement of the shoe relative to the housing.

The mechanism may further comprise resilient mounting means for mounting the outlet means to said shoe.

This provides the advantage of enabling the outlet means to be easily mounted to the shoe while enabling simple construction of the shoe, which in turn minimises the cost of production of a tool incorporating the mechanism.

According to a further aspect of the present invention, there is provided a power cutting tool comprising a housing, a motor, an output shaft adapted to execute reciprocating movement in response to said motor, and a duct mechanism as defined above.

The power tool may further comprise a fan for cooling said motor and adapted to supply flow of air to said inlet means.

BRIEF DESCRIPTION OF THE DRAWINGS

A preferred embodiment of the invention will now be described, by way of example only and not in any limitative sense, with reference to the accompanying drawings, in which.

DETAILED DESCRIPTION

Referring to FIGS. 1 to 4, a jigsaw 2 has a housing in the form of a clamshell formed from two halves 4, 6. The jigsaw 2 is formed so as to provide a handle portion 8 to be gripped by a user, and defines a region 10 where a trigger (FIG. 7) is formed so that the user can activate the jigsaw 2 in order to cut a workpiece (not shown).

Figure 3:
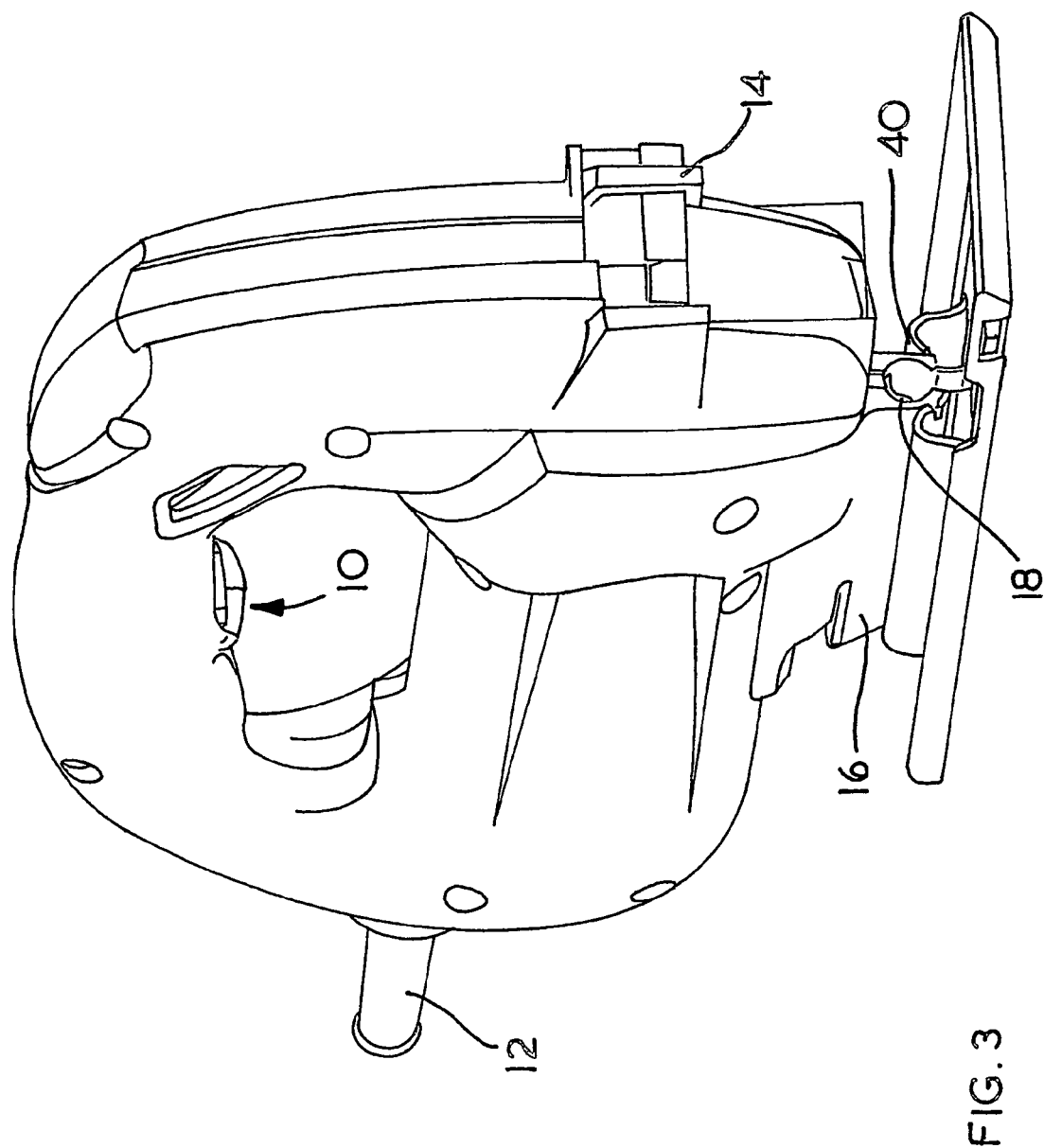
FIG. 3 is a view corresponding to FIG. 2 but with the dust blowing device removed from the jigsaw.
Figure 4:
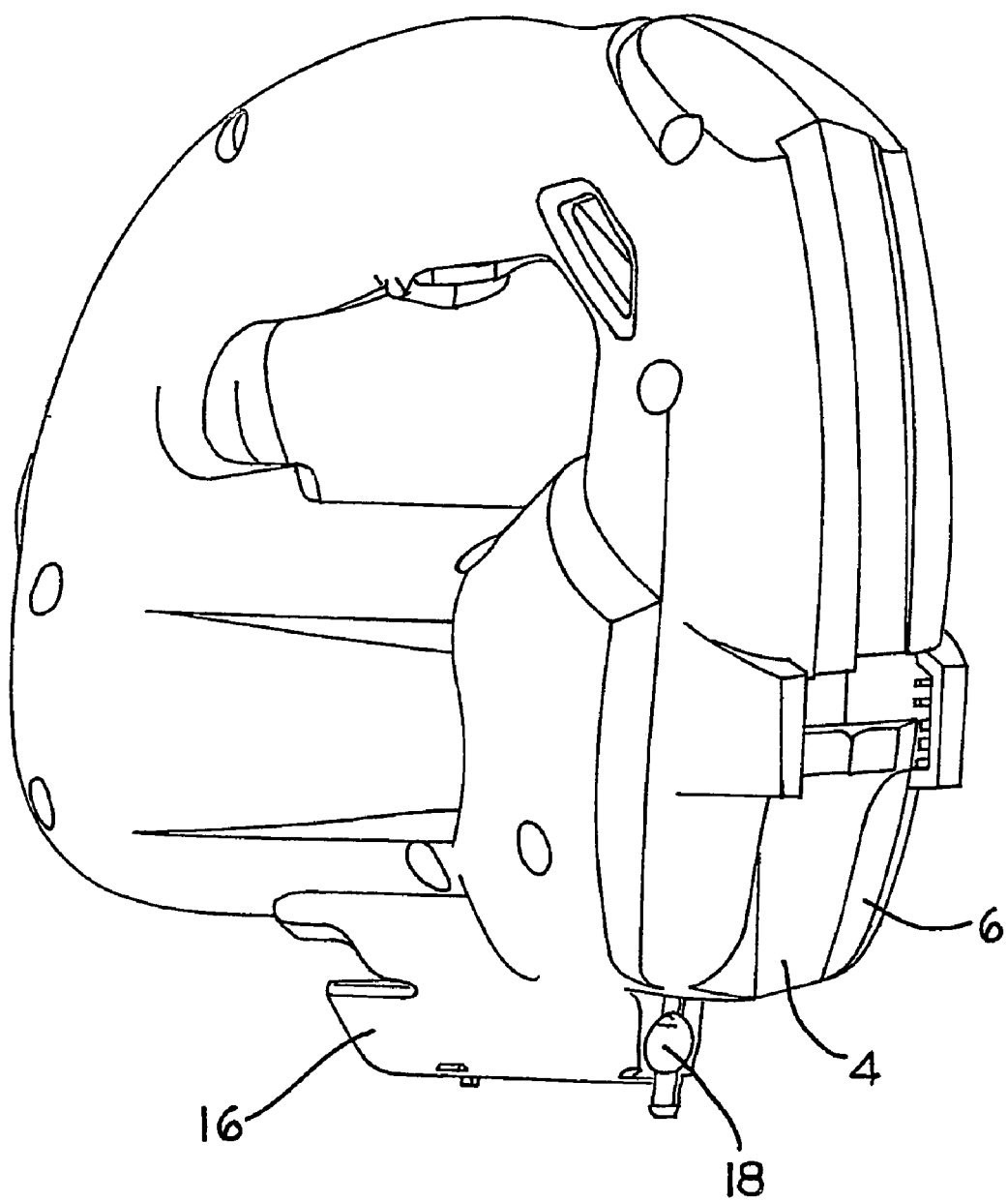
FIG. 4 is a view corresponding to FIG. 3 but with the jigsaw support shoe removed.

Power is supplied to the jigsaw 2 via power cord 12 (FIG. 3). A blade guard retaining mechanism 14 is provided at the front portion of the jigsaw.

Figure 5:
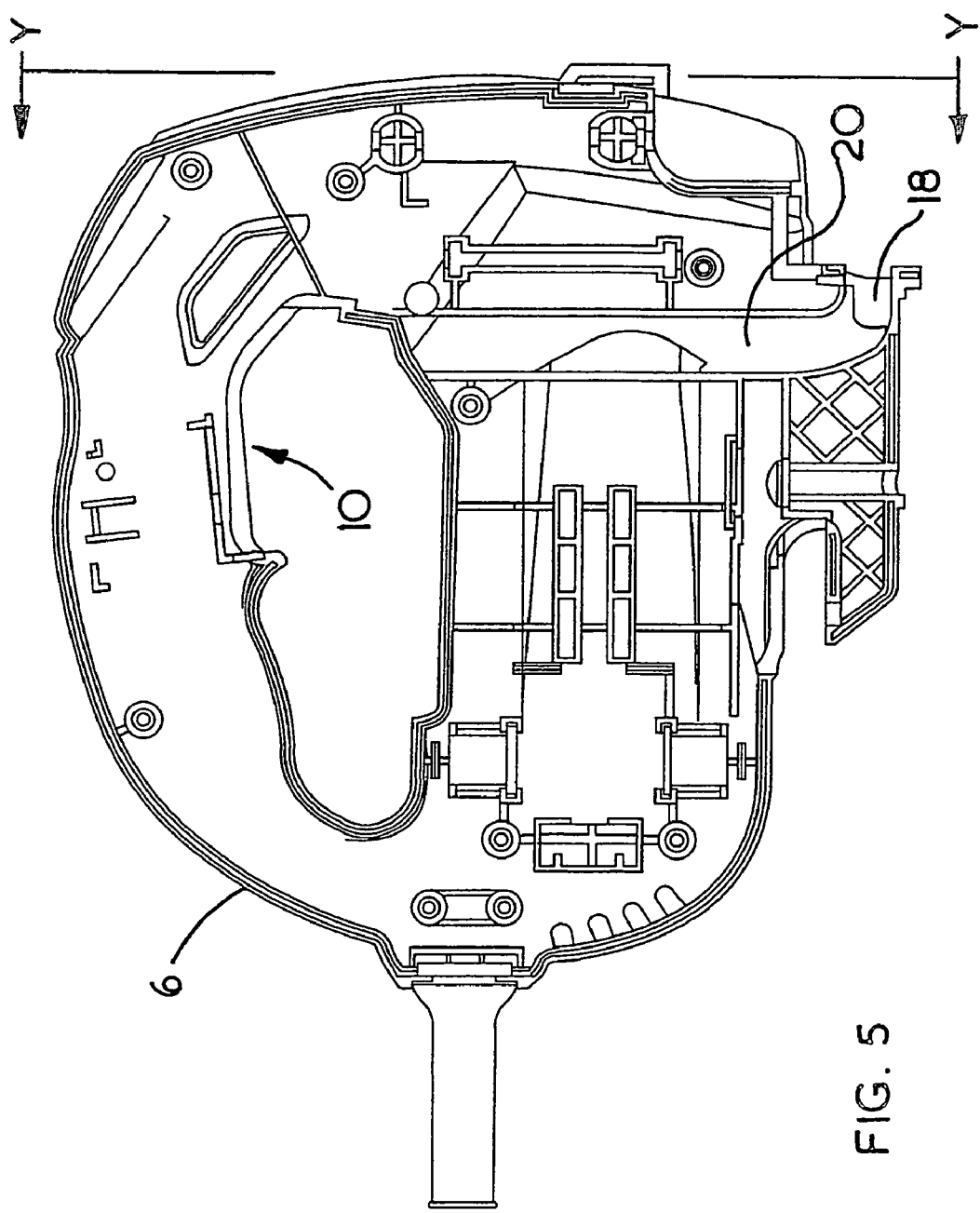
FIG. 5 is a schematic elevation view of one clamshell half of the jigsaw of FIGS. 1 to 4.
Figure 6:
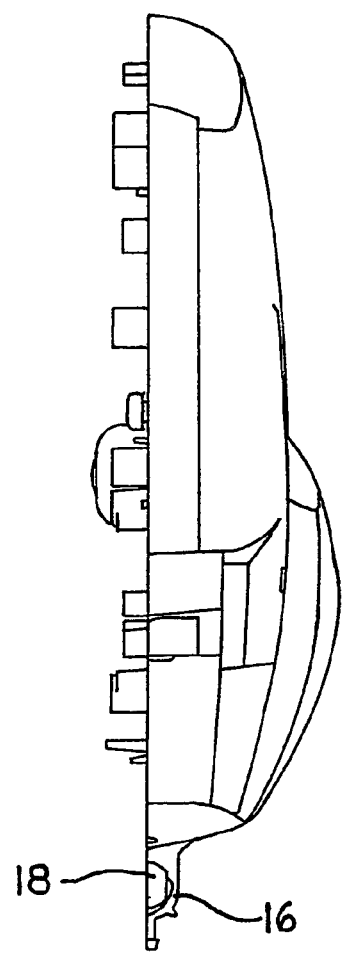
FIG. 6 is a front view of the clamshell half of FIG. 5 taken along the line Y-Y.

Referring now to FIGS. 4 to 7, it can be seen that the lower portions of the two clamshell halves 4, 6 define a lower portion 16 which provides a duct 18 through which air may be blown. As best shown in FIG. 5, the duct 18 is formed by channelling in the clamshell half 6 so that a continuous channel 20 is formed to enable the duct 18 to communicate with jigsaw fan 22 (FIG. 7) which also serves, as will be appreciated by persons skilled in the art, to cool the jigsaw motor (FIG. 7) during use of the jigsaw.

Figure 7:
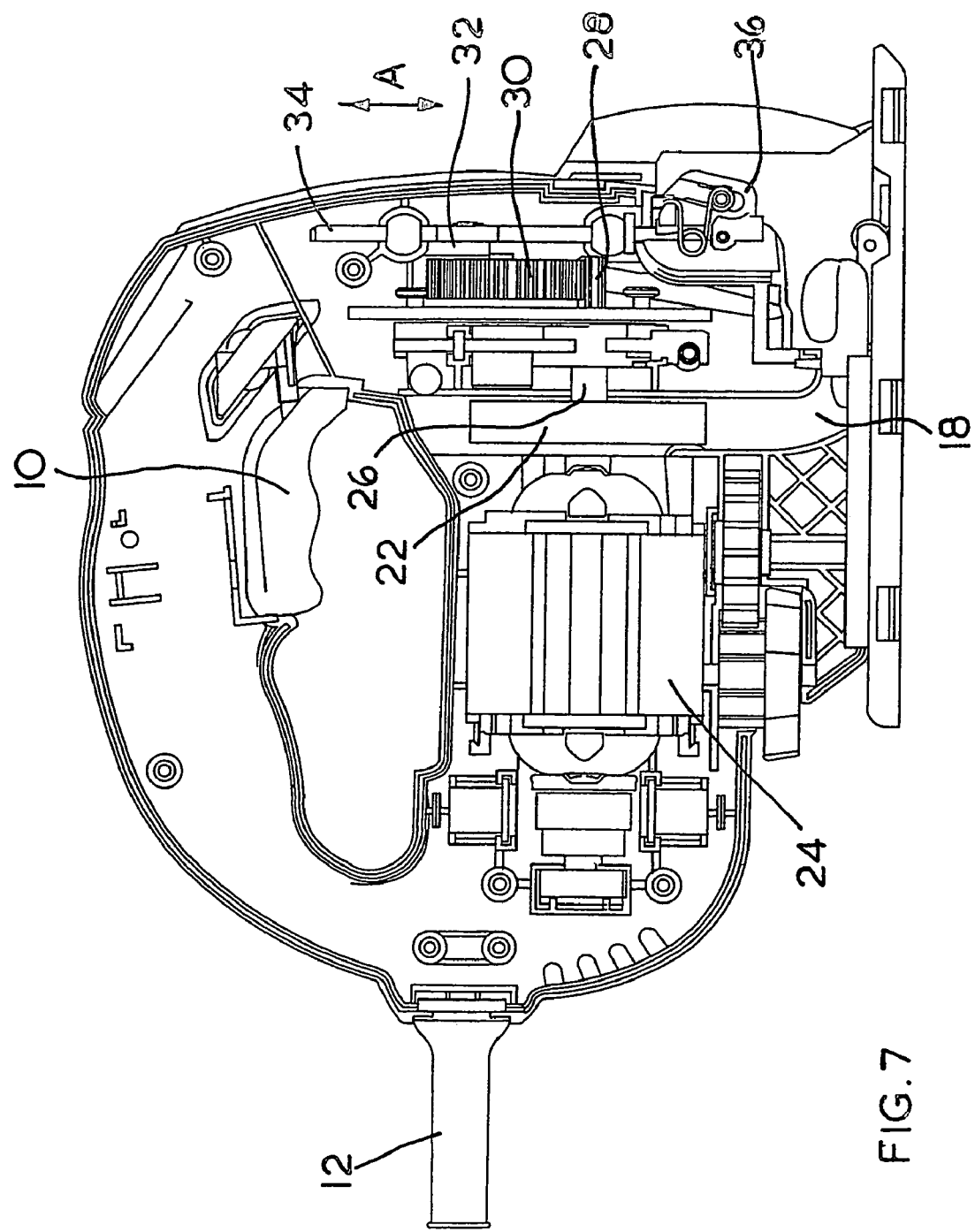
FIG. 7 is a view corresponding to FIG. 5 but showing the internal components of the jigsaw.
Figure 9:
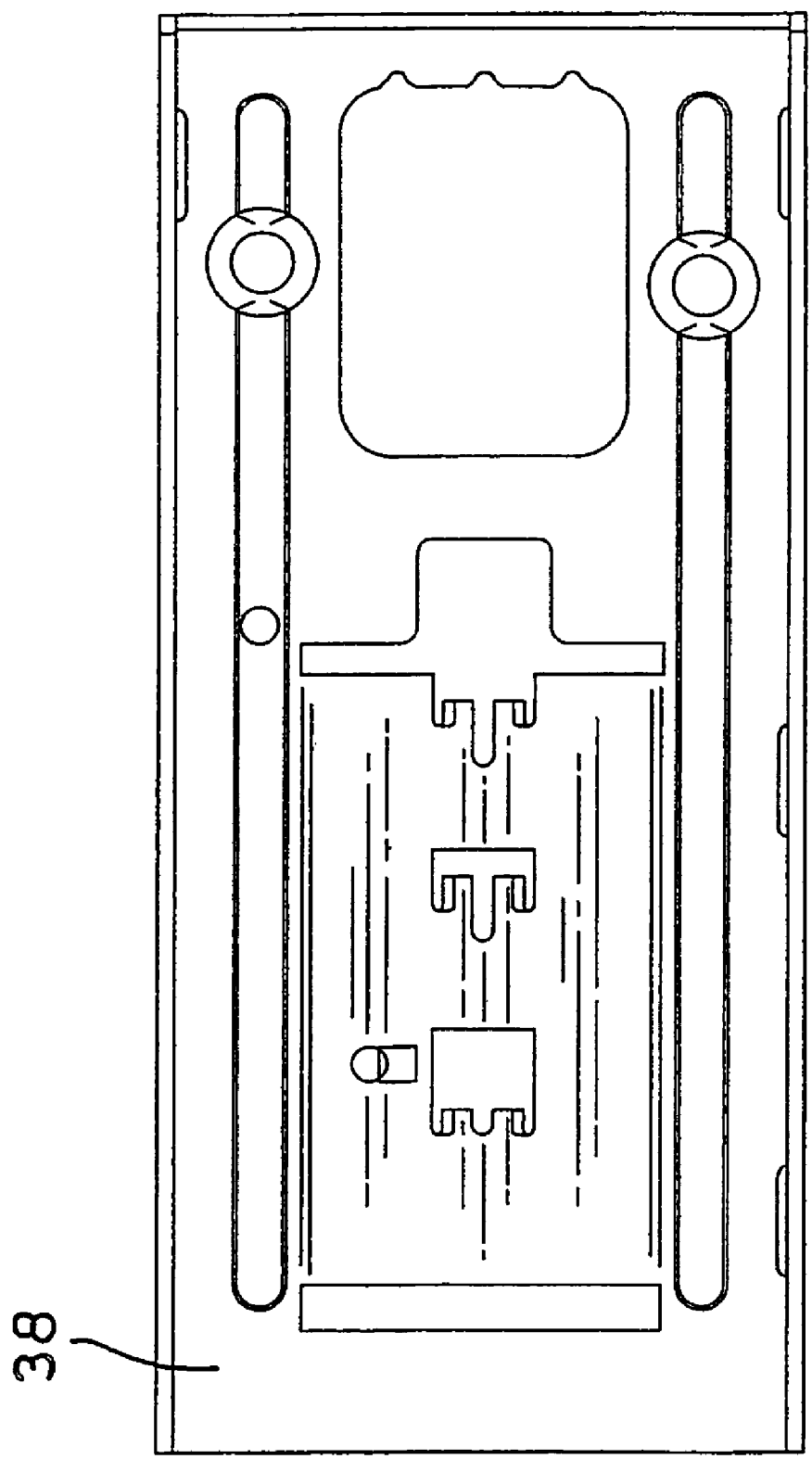
FIG. 9 is a plan view of the jigsaw shoe of FIG. 8 but with the dust blowing device removed.
Figure 10:
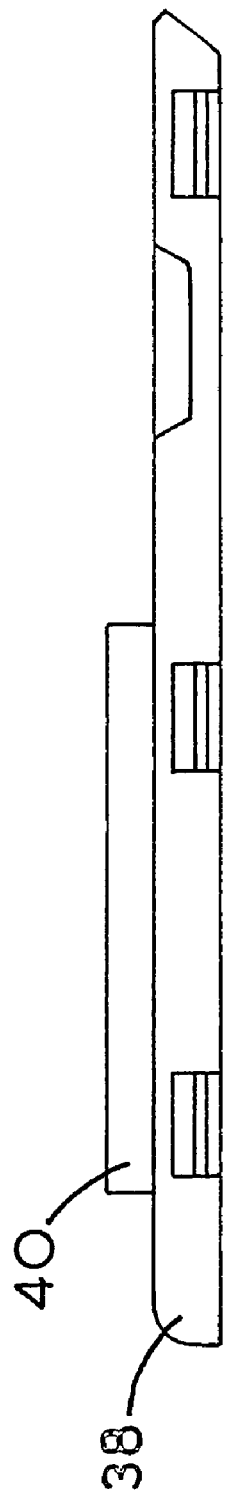
FIG. 10 is a sectional view along the line X-X of FIG. 9.
Figure 11:
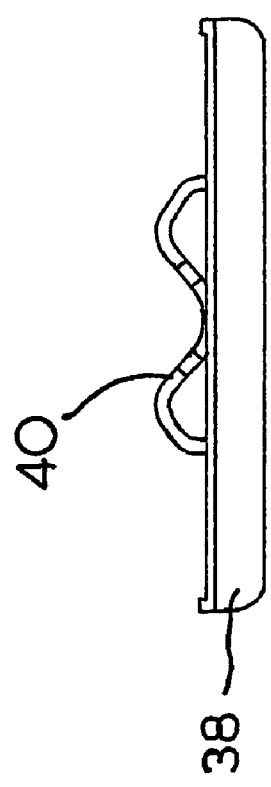
FIG. 11 is a sectional view along the line B-B of FIG. 9.
Figure 12:
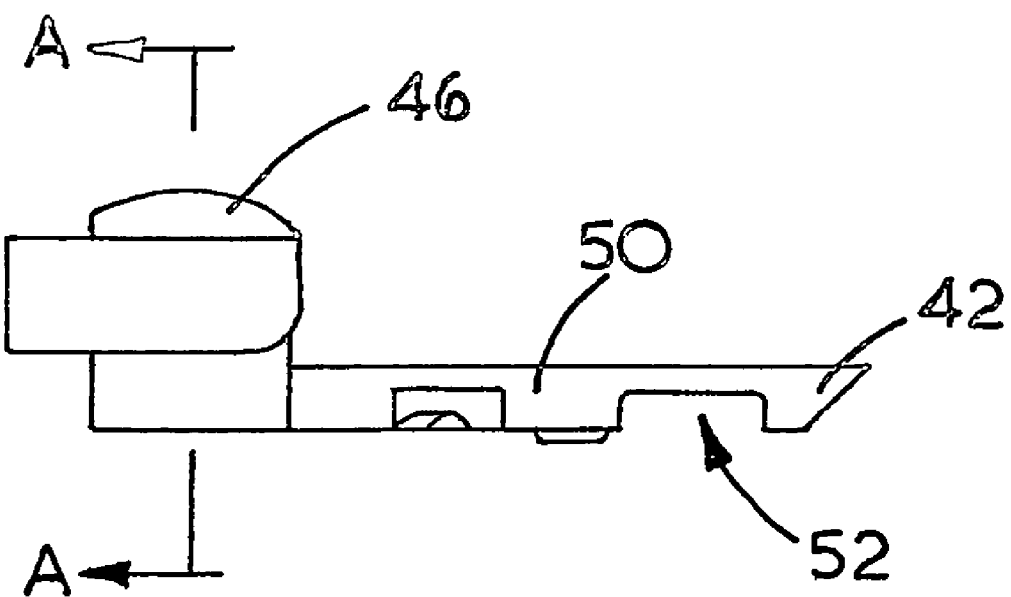
FIG. 12 is a plan view from one side of the bridge element of the dust blowing device.

When the user actuates the trigger 10 (FIG. 7), electrical power is supplied via power cable 12 to motor 24, which in turn rotates its output shaft 26 as shown in FIG. 7. The output shaft 26 has a splined drive 28 at the distal end thereof, the drive 28 communicating with a gear wheel 30. The gear wheel 30 has an eccentric 32 mounted thereon which couples, via a scotch yoke mechanism which will be familiar to persons skilled in the art, with a reciprocating drive shaft 34 which has at its lower end a blade clamping mechanism 36 for coupling a jigsaw blade (not shown) to the drive shaft 34. In this way, rotation of the output shaft 26 causes reciprocating motion of the drive shaft 34 and the jigsaw blade attached to the drive shaft 34, in the direction of arrow A in FIG. 7.

At the same time, actuation of the motor 24 causes rotation of the fan 22 which causes a stream of air to be forced from the duct 18 in order to cool the motor 24. This stream of air is also utilised to blow dust, produced during the cutting operation of the jigsaw, from a workpiece being cut, as will be described in greater detail below.

Referring now to FIGS. 8 to 17, a jigsaw support shoe 38, which is preferably stamped from a single piece of metal, is provided with a concave support surface 40. The concave support surface 40 is arranged to mate with the lower portion 16 of the jigsaw body 2 such that coupling of the convex profile of the lower portion 16 with the concave profile of the support surface 40 enables the support shoe 38 to be pivoted relative to the jigsaw body 2 to allow for bevel cutting.

The jigsaw support shoe 38 receives a bridge member 42 which clips into a corner of the support shoe 38 to define a conduit for transporting air from the duct 18 to the position at which the jigsaw blade (not shown) cuts through the workpiece.

This is achieved by the bridge member 42 coupling with a connector piece 44 situated between the output of the duct 18 and the input portion 46 of the bridge member 42, the bridge member 42 and connector piece 44 being separate elements. The bridge member 42 is hollow so as to provide a channel through which air may be vented between the jigsaw body lower portion 16 and that piece of the workpiece being cut by the jigsaw blade.

Figure 1:
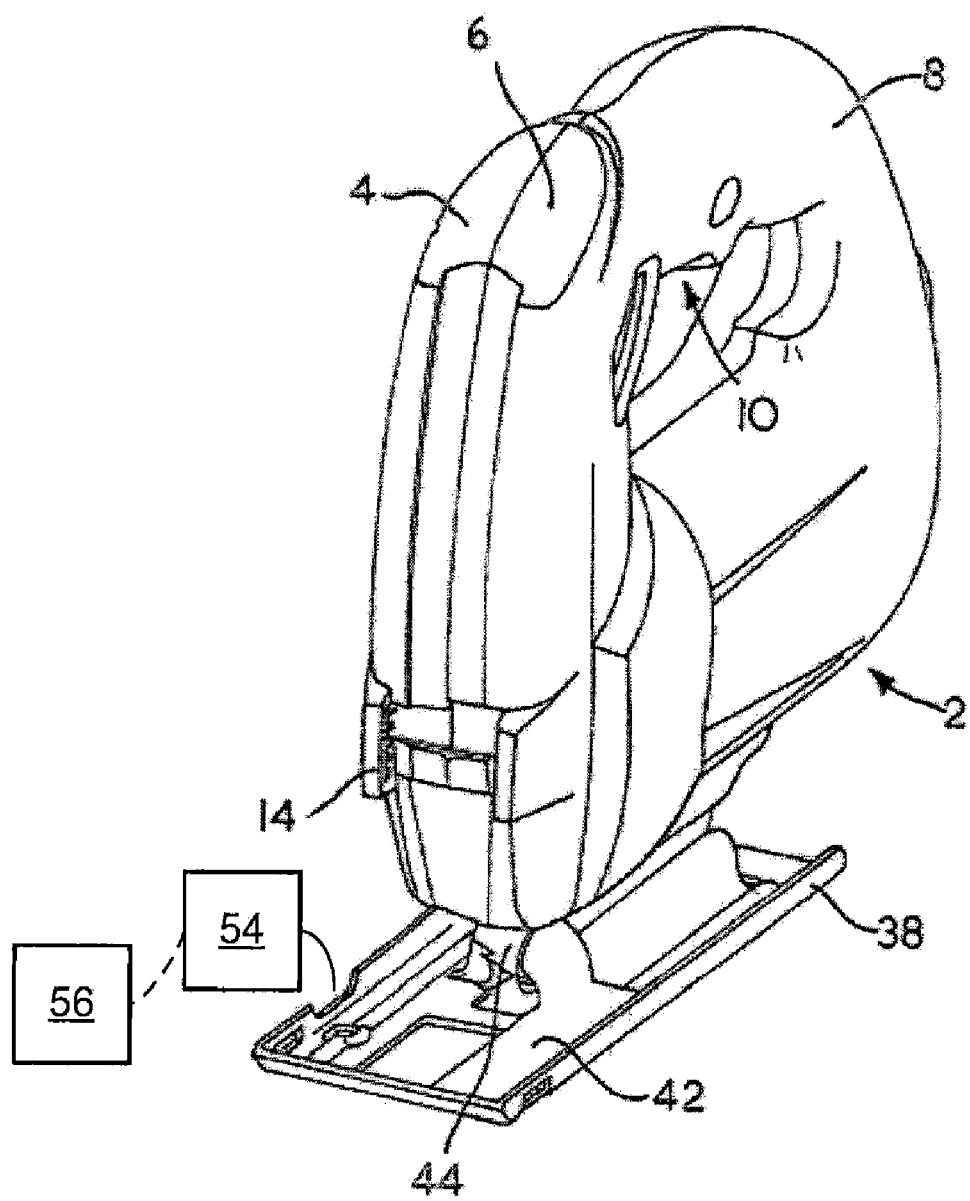
FIG. 1 is a front side perspective view of a jigsaw including a dust blowing device embodying the present invention.
Figure 2:
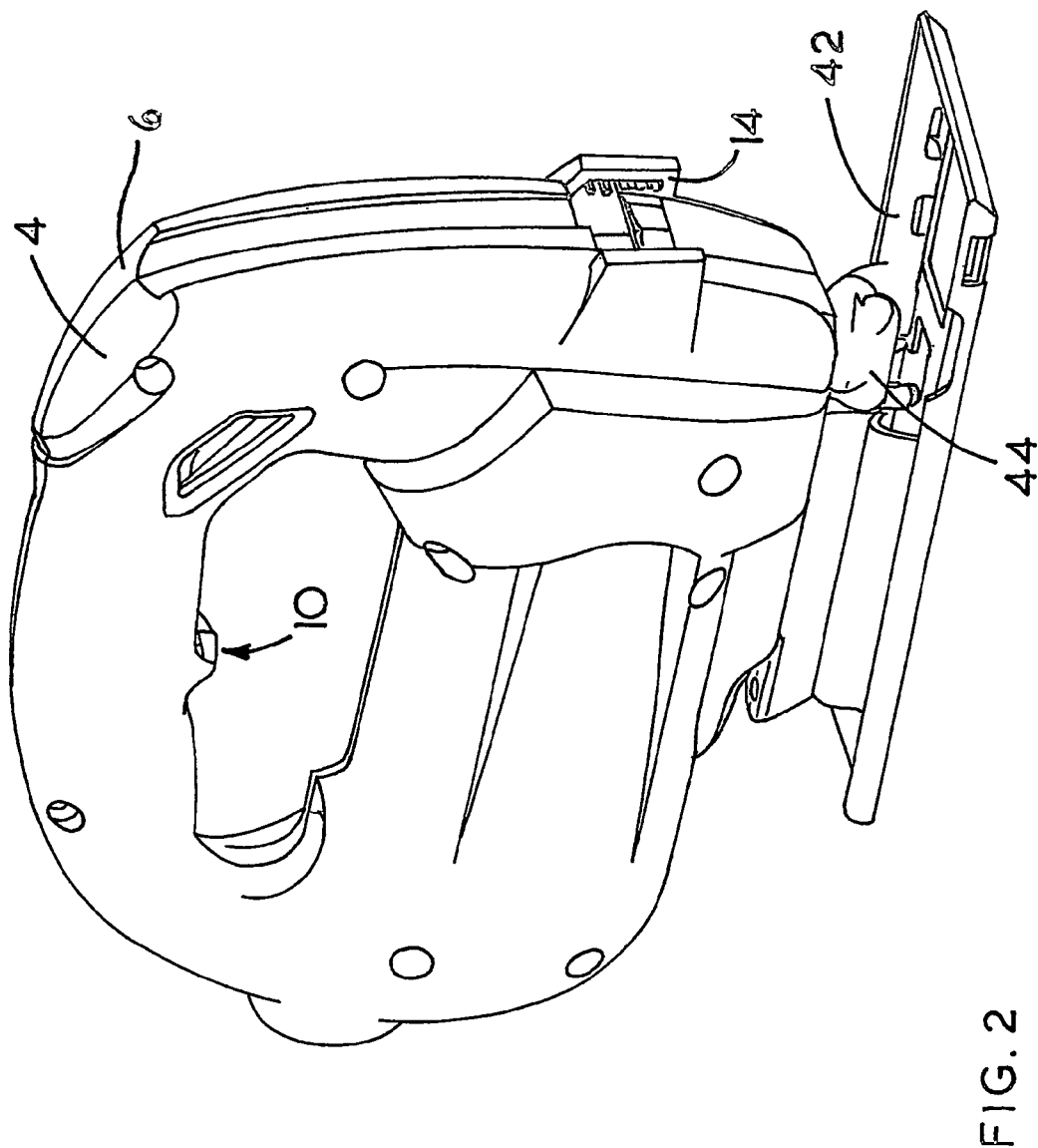
FIG. 2 is a side perspective view of the jigsaw of FIG. 1 from the opposite side to that shown in FIG. 1.
Figure 8:
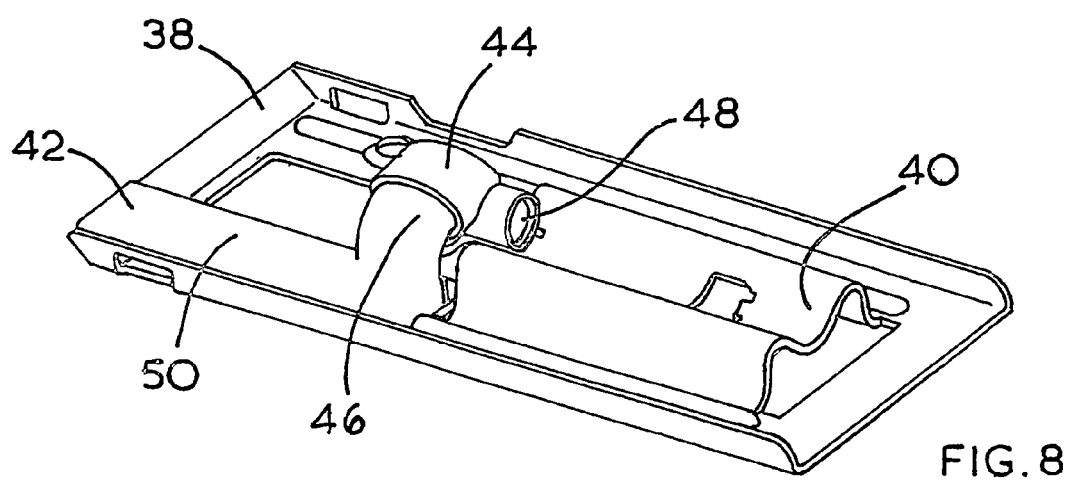
FIG. 8 is a perspective view from above and one side of the jigsaw shoe with the dust blowing device in situ.
Figure 13:
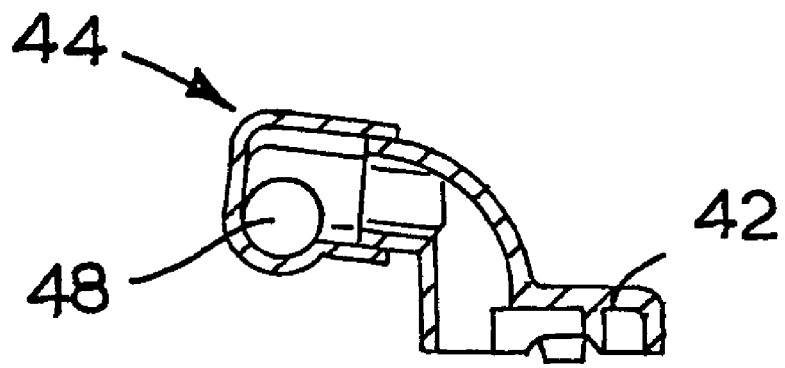
FIG. 13 is a view along the line A-A in FIG. 12.
Figure 14:
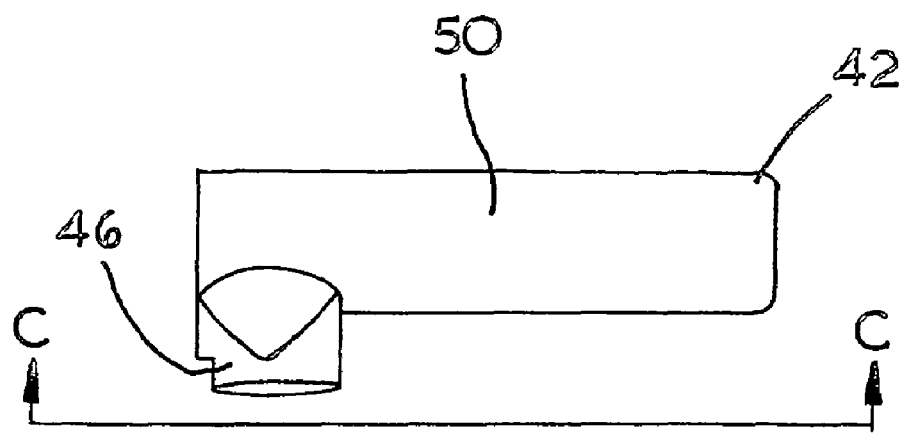
FIG. 14 is a plan view from above of the bridge element of FIG. 12.
Figure 15:
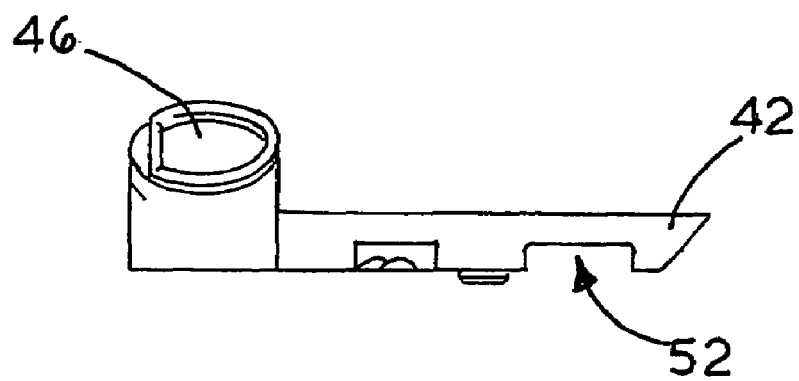
FIG. 15 is a view along the line C-C of FIG. 14.
Figure 16:
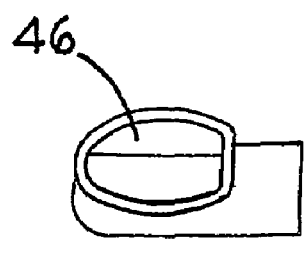
FIG. 16 is an end view of the outer dust blowing opening of the bridge element of FIG. 12.
Figure 17:
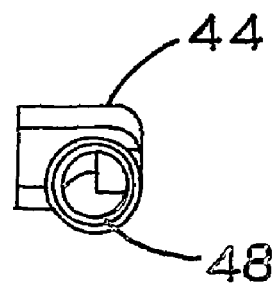
FIG. 17 is an end view of the opening of the connector piece which mates the bridge element of FIG. 12 with the jigsaw of FIGS. 1 to 4.

As shown most clearly in FIGS. 8 and 13, the connector piece 44 couples with the input portion 46 of bridge member 42. The connector piece 44 has an input port 48 of generally circular cross-section which protrudes into the external portion of the duct 18 of the lower portion 16 of jigsaw body 2, for example as seen in FIGS. 1 and 2. The input port 48 of connector piece 44 is of generally circular cross-section so as to allow pivoting of the support shoe 38 relative to the jigsaw body 2, and the connector piece 44 also serves to rotate the flow of air exiting duct 18 through approximately 90° so that it can pass to the input portion 46 of bridge member 42 to be directed towards the jigsaw blade.

Air which has entered input port 48 of the connector piece 44 and then been rotated through 90° enters the bridge member 42 via its input portion 46. Because of the hollow internal structure of bridge member 42, air passes through main extending arm 50 of the bridge member 42 from where it is ejected via exit port 52 (FIG. 15) so as to strike the jigsaw blade from one side thereof.

The operation of the jigsaw shown in the Figures will now be described.

In order to remove dust from that part of a workpiece being cut by the saw, air is directed from exit port 52 onto a side of the saw blade. The air is directed in a direction transverse to the line of action of the saw, as a result of which it can be located close to the blade so that it is effective without being obtrusive to a user of the jigsaw. At the same time, an inlet to a suction tube 54 may be arranged on the opposite side of the jigsaw blade to bridge member 42 to further constrain the flow of air. The suction tube 54 can then be connected to a source of suction 56 such as a vacuum cleaner (not shown).

It will be appreciated by persons skilled in the art that the above embodiment has been described by way of example only, and not in any limitative sense, and that various alterations and modifications are possible without departure from the scope of the invention as defined by the appended claims. For example, the bridge member 42 and connector piece 44 may be formed as a single unit, and the bridge member 42 may be provided on the opposite side of the jigsaw blade to that shown in FIG. 8.

The invention claimed is:

1. A dust mechanism for directing a flow of air onto a working member of a power cutting tool having a housing, a motor in the housing, a working member actuated by said motor and a shoe pivotally mounted relative to the working member and adapted to engage a workpiece, the dust mechanism comprising:

a connector piece having an input port that is connected to a duct in the housing, wherein said input port receives the flow of air from the housing in a direction generally in line with an axis of pivotal movement of the shoe relative to the housing and wherein said connector piece is operable to rotate relative to said duct in the housing when the shoe pivots relative to the housing and while said connector piece is fluidly connected to said duct; and a bridge member fluidly connected to said connector piece and removably connected to a top surface of the shoe opposite a surface adapted to engage the workpiece, wherein said bridge member defines a generally hollow channel that terminates at an exit port from which the flow of air from said duct in the housing is directed onto the working member in a direction transverse to a line of action of the tool.

2. The dust mechanism of claim 1 wherein said connector piece and said bridge member are separate pieces fluidly connected and wherein said connector piece is moveable relative to said bridge member.

3. The dust mechanism of claim 2 wherein said connector piece and said bridge member have mating curved surfaces that permit said connector piece and said bridge member rotate relative to one another.

4. The dust mechanism of claim 1 further comprising a resilient connector piece that mounts said bridge member to said surface of the shoe.

5. The dust mechanism of claim 1 further comprising an output shaft that executes a reciprocating movement in response to said motor.

6. The dust mechanism of claim 5 further comprising a fan for cooling said motor and for supplying the flow of air to said connector piece of the dust mechanism.

7. The dust mechanism of claim 1 further comprising an inlet to a suction source disposed adjacent to the working member and on a side thereof opposite to a side from which the flow of air is supplied by said bridge member.

8. The dust mechanism of claim 1 wherein said duct extends in a direction through said housing that is generally parallel to said axis of pivotal movement of the shoe relative to the housing.

9. The dust mechanism of claim 8 wherein said duct is open to a front side of the power cutting tool.

10. A power cutting tool for cutting a workpiece, the cutting tool comprising:
    a housing, and a motor contained in said housing;
    a duct formed in said housing, wherein said duct is open to a front side of the power cutting tool and wherein said duct connects to an airflow pathway in said housing through which a fan connected to said motor establishes a flow of air;
    a working member actuated by said motor;
    a shoe pivotally mounted to said housing relative to the working member, said shoe adapted to engage the workpiece; and
    a dust mechanism including a connector piece fluidly connected to a bridge member,
        wherein said connector piece includes an input port that is connected to said duct in said housing,
        wherein said connector piece receives said flow of air from said duct in a direction generally in line with an axis of pivotal movement of said shoe relative to said housing,
        wherein said connector piece is operable to rotate relative to said duct in said housing when said shoe pivots relative to said housing and while said connector piece is fluidly connected to said duct,
        wherein said bridge member is removably connected to a top surface of said shoe opposite a surface adapted to engage the workpiece, and
        wherein said bridge member defines a generally hollow channel that terminates at an exit port from which the flow of air from said duct in said housing and through said connector piece is directed onto said working member in a direction transverse to said line of action of the power cutting tool.

11. The power cutting tool of claim 10, wherein said connector piece and said bridge member are separate pieces fluidly connected and wherein said connector piece is moveable relative to said bridge member.

12. The power cutting tool of claim 10 further comprising a resilient connector piece that mounts said bridge member to said surface of the shoe opposite said surface that engages the workpiece.

13. The power cutting tool of claim 10 further comprising an inlet to a suction source disposed adjacent to said working member and on a side thereof opposite to a side from which the flow of air is supplied by said bridge member.

* * * * *